*US011047324B2*

United States Patent
Muto et al.

(10) Patent No.: US 11,047,324 B2
(45) Date of Patent: Jun. 29, 2021

(54) OXYGEN STORAGE AMOUNT ESTIMATION DEVICE, OXYGEN STORAGE AMOUNT ESTIMATION SYSTEM, CONTROLLER FOR INTERNAL COMBUSTION ENGINE, DATA ANALYSIS DEVICE, AND METHOD FOR ESTIMATING OXYGEN STORAGE AMOUNT

(71) Applicant: TOYOTA JIDOSHA KABUSHIKI KAISHA, Toyota (JP)

(72) Inventors: Harufumi Muto, Miyoshi (JP); Akihiro Katayama, Toyota (JP); Yosuke Hashimoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/835,412

(22) Filed: Mar. 31, 2020

(65) Prior Publication Data
US 2020/0332731 A1 Oct. 22, 2020

(30) Foreign Application Priority Data

Apr. 18, 2019 (JP) .............................. JP2019-079078

(51) Int. Cl.
*F02D 41/02* (2006.01)
*F02D 41/14* (2006.01)
*F01N 11/00* (2006.01)

(52) U.S. Cl.
CPC ........ *F02D 41/0295* (2013.01); *F01N 11/007* (2013.01); *F01N 2550/02* (2013.01);
(Continued)

(58) Field of Classification Search
CPC ........ F01N 11/00; F01N 11/007; F01N 3/023; F01N 3/101; F01N 9/00; F01N 2240/036;
(Continued)

(56) References Cited

U.S. PATENT DOCUMENTS

2017/0145939 A1* 5/2017 Okazaki .............. F02D 41/1475
2017/0175656 A1* 6/2017 Masubuchi ........... F01N 3/0864
(Continued)

FOREIGN PATENT DOCUMENTS

JP 2000-282925 A 10/2000
JP 2006-316726 A 11/2006

*Primary Examiner* — Audrey K Bradley
*Assistant Examiner* — Dapinder Singh
(74) *Attorney, Agent, or Firm* — Oblon, McClelland, Maier & Neustadt, L.L.P.

(57) ABSTRACT

An oxygen storage amount estimation device estimates an oxygen storage amount of a catalyst disposed in an exhaust passage of an internal combustion engine. The oxygen storage amount estimation device includes a storage device and processing circuitry. The storage device stores mapping data, which is data specifying a mapping that uses multiple variables including at least an excess-deficient amount variable and a previous value of a storage amount variable as an input to output a value of the storage amount variable. The processing circuitry executes a storage amount variable calculation process that repeatedly calculates a value of the storage amount variable based on an output of the mapping using the multiple variables and an operation process that operates predetermined hardware based on a calculation result of the storage amount variable calculation process. The mapping data includes data learned by machine learning.

10 Claims, 5 Drawing Sheets

(52) U.S. Cl.
CPC ..... *F01N 2560/025* (2013.01); *F01N 2900/1624* (2013.01); *F02D 41/1454* (2013.01); *F02D 2200/0814* (2013.01)

(58) Field of Classification Search
CPC ............ F01N 2550/02; F01N 2550/04; F01N 2560/025; F01N 2560/06; F01N 2900/1624; F02D 41/0295; F02D 41/1454; F02D 41/029; F02D 2200/0802; F02D 2200/0814
USPC ............... 60/274, 277, 286, 295, 299–301
See application file for complete search history.

(56) References Cited

U.S. PATENT DOCUMENTS

| | | | |
|---|---|---|---|
| 2017/0218868 A1* | 8/2017 | Okazaki | F02D 41/2454 |
| 2017/0306872 A1* | 10/2017 | Hokuto | F02D 41/025 |
| 2018/0010539 A1* | 1/2018 | Inoshita | F01N 11/007 |
| 2018/0179941 A1* | 6/2018 | Bisaiji | B01D 53/9422 |
| 2018/0347489 A1* | 12/2018 | Inoshita | B01D 53/9495 |
| 2019/0078490 A1* | 3/2019 | Lee | F01N 3/101 |

\* cited by examiner

Fig.4

OXYGEN STORAGE AMOUNT ESTIMATION DEVICE, OXYGEN STORAGE AMOUNT ESTIMATION SYSTEM, CONTROLLER FOR INTERNAL COMBUSTION ENGINE, DATA ANALYSIS DEVICE, AND METHOD FOR ESTIMATING OXYGEN STORAGE AMOUNT

BACKGROUND

1. Field

The following description relates to an oxygen storage amount estimation device, an oxygen storage amount estimation system, a controller for an internal combustion engine, a data analysis device, and a method for estimating an oxygen storage amount.

2. Description of Related Art

Japanese Laid-Open Patent Publication No. 2006-316726 describes an example of a device that estimates a particulate matter (PM) amount, that is, an amount of particulate matter collected in a filter disposed in an exhaust passage, based on rotation speed and load of the internal combustion engine.

The filter may support a catalyst capable of storing oxygen. In this case, particulate matter is oxidized by oxygen stored in the catalyst, and thus the PM amount is dependent on the oxygen storage amount. When the PM amount is estimated without using the oxygen storage amount, the estimation accuracy will decrease. In a typical internal combustion engine that includes a catalyst capable of storing oxygen, it is desirable that the oxygen storage amount be obtained in order to control the control aspects of the internal combustion engine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Multiple aspects of the present disclosure and their operation and advantages will be described.

Aspect 1. An aspect of the present disclosure provides an oxygen storage amount estimation device configured to estimate an oxygen storage amount of a catalyst disposed in an exhaust passage of an internal combustion engine. The oxygen storage amount estimation device includes a storage device and processing circuitry. An amount of fuel that reacts with oxygen contained in a fluid flowing into the catalyst without excess or deficiency is an ideal fuel amount. A variable corresponding to an excess-deficient amount of an actual amount of fuel in relation to the ideal fuel amount is an excess-deficient amount variable. A variable related to the oxygen storage amount of the catalyst is a storage amount variable. The storage device stores mapping data, which is data specifying a mapping that uses multiple variables as an input to output a value of the storage amount variable. The multiple variables including at least the excess-deficient amount variable and a previous value of the storage amount variable. The processing circuitry is configured to execute an obtainment process that obtains the multiple variables, a storage amount variable calculation process that repeatedly calculates a value of the storage amount variable based on an output of the mapping using the multiple variables obtained by the obtainment process, and an operation process that operates predetermined hardware based on a calculation result of the storage amount variable calculation process. The mapping data includes data learned by machine learning.

In the configuration described above, the amount of change in the oxygen storage amount of the catalyst is obtained based on the excess-deficient amount variable. More specifically, the value of the storage amount variable is calculated and updated based on the excess-deficient amount variable and the previous value of the storage amount variable.

In a configuration differing from the configuration described above, the value of the storage amount variable may be calculated based on map data using the excess-deficient amount variable, the previous value of the storage amount variable, and another variable. In this case, the map data is adapted for each value of the variables. Therefore, when the number of variables is increased, the map data is increased in an exponential manner, and the number of man-hours for adaptation is overly increased. In the configuration described above, machine learning is used to calculate the value of the storage amount variable. More specifically, the value of the storage amount variable is calculated through a join operation of the excess-deficient amount variable and another variable using a parameter learned by machine learning. Therefore, the parameter that is common to various values of the variable is learned. In the configuration described above, the number of man-hours for adaptation is reduced as compared to in a configuration that adapts map data.

Aspect 2. In the oxygen storage amount estimation device according to aspect 1, the multiple variables may include a temperature variable, which is a variable related to a temperature of the catalyst.

In the configuration described above, the temperature variable is included in the input to the mapping. This allows the value of the storage amount variable to be calculated reflecting the dependency of the maximum value of the oxygen storage amount of the catalyst on the temperature of the catalyst and the dependency of the consumption amount of oxygen in the catalyst on the temperature of the catalyst.

Aspect 3. In the oxygen storage amount estimation device according to aspect 1 or 2, the multiple variables may include a flow rate variable, which is a variable related to a flow rate of the fluid flowing into the catalyst.

In the configuration described above, the flow rate variable is included in the input to the mapping. This allows the value of the storage amount variable to be calculated reflecting the reaction rate of stored oxygen with unburned fuel that changes in accordance with the flow rate of fluid flowing through the catalyst.

Aspect 4. In the oxygen storage amount estimation device according to any one of aspects 1 to 3, the excess-deficient amount may be calculated based on a detection value of an air-fuel ratio sensor disposed upstream of the catalyst and a flow rate of the fluid flowing into the catalyst. The excess-deficient amount variable may be a variable related to an integrated value of the excess-deficient amount in a predetermined period.

In the configuration described above, the excess-deficient amount variable is a variable related to the integrated value of the excess-deficient amount. As compared to a configuration that uses the excess-deficient amount as the input to the mapping, the calculation cycle of the storage amount variable may extend while the value of the storage amount variable is calculated with high accuracy.

Aspect 5. The oxygen storage amount estimation device according to aspect 4, the catalyst may be a downstream catalyst. An upstream catalyst may be disposed in the exhaust passage upstream of the downstream catalyst. The air-fuel ratio sensor may be disposed between the upstream catalyst and the downstream catalyst.

In the configuration described above, the detection value of the air-fuel ratio sensor disposed between the upstream catalyst and the downstream catalyst is used. The value of the excess-deficient amount variable is calculated with higher accuracy than in a configuration that uses a detection value of an air-fuel ratio sensor disposed upstream of the upstream catalyst.

Aspect 6. The oxygen storage amount estimation device according to any one of aspects 1 to 5, the multiple variables may include a deterioration variable, which is a variable related to a deterioration degree of the catalyst.

In the configuration described above, the deterioration variable is included in the input to the mapping. This allows the value of the storage amount variable to be calculated reflecting the maximum value of the oxygen storage amount of the catalyst that varies in accordance with the deterioration degree.

Aspect 7. The oxygen storage amount estimation device according to any one of aspects 1 to 6, the catalyst may be supported by a filter configured to collect particulate matter contained in exhaust gas. The multiple variables may include an oxidation amount variable, which is a variable related to an oxidation amount of particulate matter collected in the filter.

In the configuration described above, the value of the storage amount variable is calculated taking into consideration that that the oxygen storage amount of the catalyst decreases in accordance with the oxidation amount of particulate matter in the catalyst.

Aspect 8. In the oxygen storage amount estimation device according to any one of aspects 1 to 7, the catalyst may be supported by a filter configured to collect particulate matter contained in exhaust gas. The processing circuitry may be configured to execute a process that calculates a particulate matter (PM) deposition amount, which is an amount of the particulate matter collected in the filter, based on a value of the storage amount variable calculated by the storage amount variable calculation process. The predetermined hardware may include an exhaust temperature operating unit, which is an operating unit of the internal combustion engine used to increase a temperature of exhaust gas. The operation process may include a regeneration process that operates the exhaust temperature operating unit to burn the particulate matter collected in the filter.

In the configuration described above, the storage amount variable calculation process updates the value of the storage amount variable based on the previous value of the storage amount variable. The PM deposition amount is calculated based on the updated value of the storage amount variable. Thus, the PM deposition amount may be calculated without the need for a detection value of an air-fuel ratio sensor disposed downstream of the catalyst. In addition, in the configuration described above, the previous value of the storage amount variable is used to calculate the PM deposition amount. The calculation accuracy of the PM deposition amount is increased as compared to a configuration that calculates the PM deposition amount without using the previous value of the storage amount variable. This allows the regeneration process to be executed less frequently and shortens the execution time of the regeneration process.

Aspect 9. In the oxygen storage amount estimation device according to any one of aspects 1 to 8, the catalyst may be a downstream catalyst. An upstream catalyst may be disposed in the exhaust passage upstream of the downstream catalyst. The predetermined hardware may include a fuel injection valve of the internal combustion engine. The operation process may include a process that operates the fuel injection valve so that when the oxygen storage amount is less than or equal to a predetermined amount, a lean level of an air-fuel ratio of a mixture in a combustion chamber of the internal combustion engine in relation to a stoichiometric air-fuel ratio is increased as compared to when the oxygen storage amount is greater than the predetermined amount. Decreases in the oxygen storage amount of the downstream catalyst may allow unburned fuel to discharge downstream of the downstream catalyst. In this regard, in the configuration described above, when the oxygen storage amount is less than or equal to the predetermined amount, the air-fuel ratio of the mixture is set to be leaner, so that the oxygen storage amount of the downstream catalyst is increased.

Aspect 10. An aspect of the present disclosure provides an oxygen storage amount estimation system. The oxygen storage amount estimation system includes the processing circuitry and the storage device according to any one of aspects 1 to 9. The processing circuitry includes a first execution device and a second execution device. The first execution device is mounted on a vehicle and is configured to execute the obtainment process, a vehicle-side transmission process that transmits data obtained by the obtainment process outside the vehicle, a vehicle-side reception process that receives a signal based on a value of the storage amount variable calculated by the storage amount variable calculation process, and the operation process. The second execution device is disposed outside the vehicle and is configured to execute an external reception process that receives data transmitted by the vehicle-side transmission process, the storage amount variable calculation process, and an external transmission process that transmits a signal based on a value of the storage amount variable calculated by the storage amount variable calculation process to the vehicle.

In the configuration described above, the storage amount variable calculation process is executed outside the vehicle. This reduces the calculation load on the vehicle side.

Aspect 11. An aspect of the present disclosure provides a data analysis device that includes the second execution device and the storage device according to aspect 10.

Aspect 12. An aspect of the present disclosure provides a controller for an internal combustion engine that includes the first execution device according to aspect 10.

Aspect 13. An aspect of the present disclosure provides a method for estimating an oxygen storage amount that includes causing a computer to execute the obtainment process, the storage amount variable calculation process, and the operation process according to any one of aspects 1 to 9.

The method described above obtains operation and advantages similar to those in aspects 1 to 9 described above.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment for an oxygen storage amount estimation device will now be described with reference to the drawings.

Figure 1:
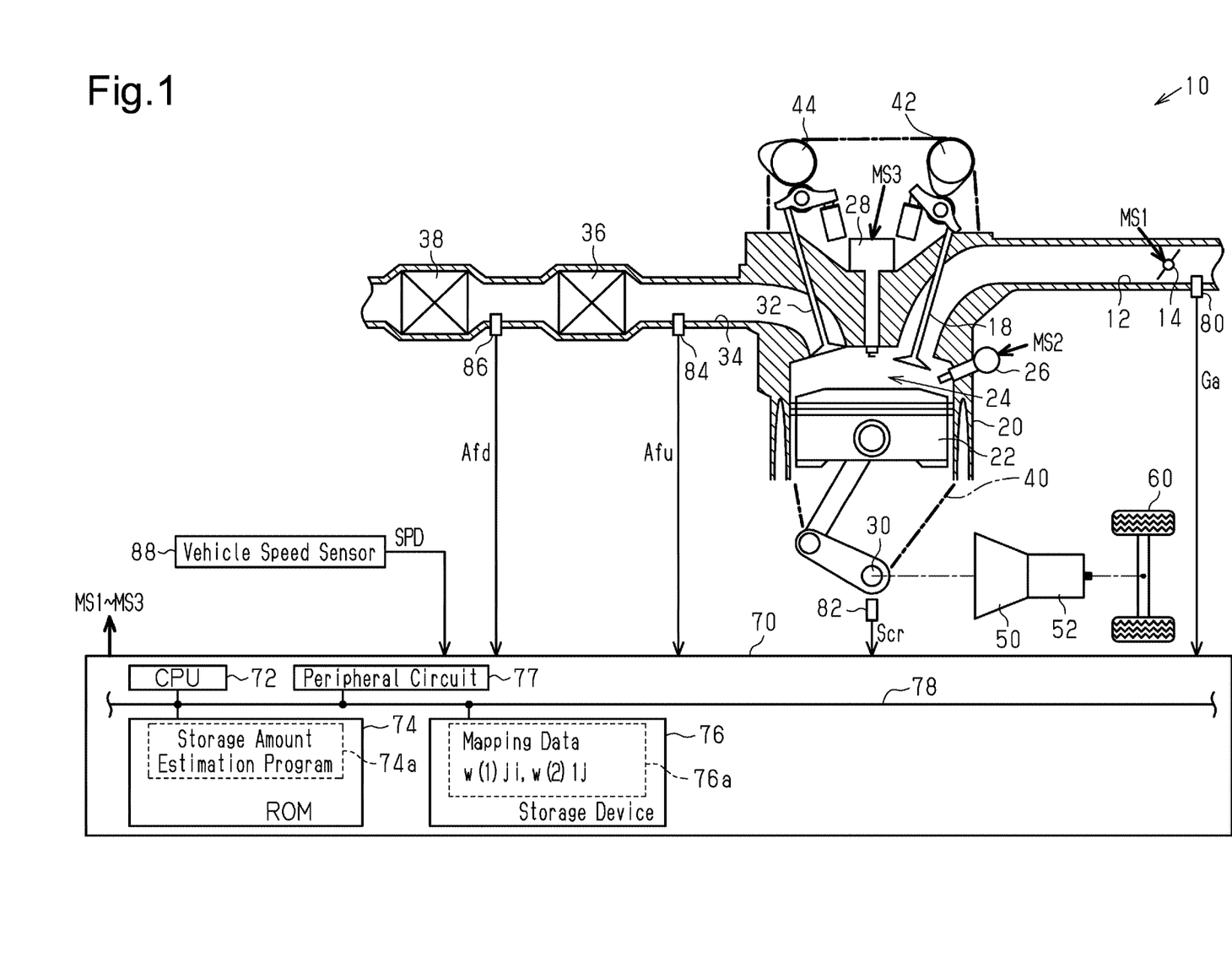
FIG. 1 is a diagram showing the configurations of a controller and a drive system of a vehicle according to a first embodiment.

FIG. 1 shows an internal combustion engine 10 mounted on a vehicle. A throttle valve 14 is disposed in an intake passage 12 of the internal combustion engine 10. When an intake valve 18 is open, air drawn into the intake passage 12 flows into a combustion chamber 24 defined by a cylinder 20 and a piston 22. A fuel injection valve 26 is configured to inject fuel into the combustion chamber 24. In the combustion chamber 24, the air-fuel mixture of the fuel and air is burned by spark discharge of an ignition device 28. Combustion energy generated by the combustion is converted into rotational energy of a crankshaft 30 through the piston 22. The burned air-fuel mixture is discharged to an exhaust passage 34 as exhaust gas when an exhaust valve 32 is open. The exhaust passage 34 is provided with a three-way catalyst (catalyst 36) capable of storing oxygen and a filter supporting a three-way catalyst capable of storing oxygen to collect particulate matter (PM) in order from the upstream side. In the present embodiment, the filter supporting a three-way catalyst capable of storing oxygen to collect particulate matter is a gasoline particulate filter (GPF) 38.

Rotational power of the crankshaft 30 is transmitted through a timing chain 40 to an intake camshaft 42 and an exhaust camshaft 44. The crankshaft 30 is mechanically coupled to drive wheels 60 by a torque converter 50 and a transmission 52.

The internal combustion engine 10 is controlled by a controller 70, which operates operating units of the internal combustion engine 10 such as the throttle valve 14, the fuel injection valve 26, and the ignition device 28 to control the control aspects such as torque and exhaust components. FIG. 1 shows respective operating signals MS1 to MS3 of the throttle valve 14, the fuel injection valve 26, and, the ignition device 28.

When controlling the control aspects, the controller 70 refers to an intake air amount Ga detected by an airflow meter 80 and an output signal Scr of a crank angle sensor 82. The controller 70 also refers to an upstream detection valve Afu, which is a detection value of an upstream air-fuel ratio sensor 84 disposed at the upstream side of the catalyst 36, downstream detection value Afd, which is a detection valve of a downstream air-fuel ratio sensor 86 disposed between the catalyst 36 and the GPF 38, and a vehicle speed SPD detected by a vehicle speed sensor 88.

The controller 70 includes a CPU 72, a ROM 74, a storage device 76, and a peripheral circuit 77, which are configured to communicate with each other through a local network 78. The storage device 76 is an electrically rewritable nonvolatile memory. The peripheral circuit 77 includes, for example, a circuit that generates a clock signal regulating an internal operation, a power supply circuit, and a reset circuit.

The controller 70 controls the above-described control aspects by causing the CPU 72 to execute programs stored in the ROM 74.

Figure 2:
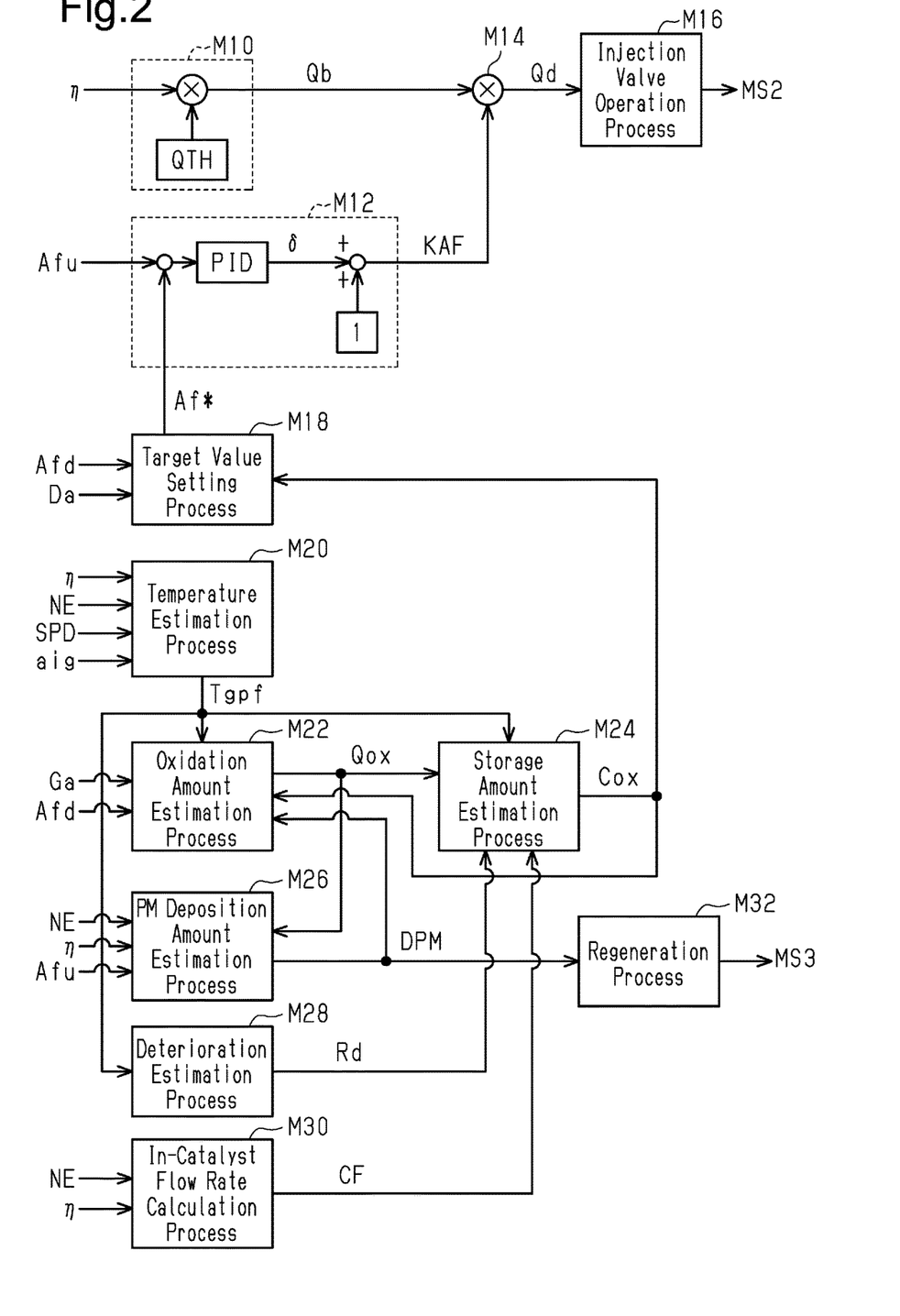
FIG. 2 is a block diagram showing some of the processes executed by the controller of the first embodiment.

FIG. 2 shows some of the processes implemented by the CPU 72 executing programs stored in the ROM 74.

A base injection amount calculating process M10 calculates a base injection amount Qb based on a charging efficiency η. The base injection amount Qb is a base amount of fuel that sets the air-fuel ratio of the mixture in the combustion chamber 24 to a target air-fuel ratio. More specifically, for example, when the charging efficiency η is expressed as percentage, the base injection amount calculating process M10 may calculate the base injection amount Qb by multiplying the charging efficiency η by a fuel amount QTH corresponding to 1% of the charging efficiency η that sets the air-fuel ratio the target air-fuel ratio. The base injection amount Qb is a fuel amount that is calculated based on the amount of air charged in the combustion chamber 24 so that the air-fuel ratio is controlled to the target air-fuel ratio. In the present embodiment, the stoichiometric air-fuel ratio is exemplified as the target air-fuel ratio. The charging efficiency η is a parameter that specifies the amount of air charged in the combustion chamber 24 and is calculated by the CPU 72 based on a rotation speed NE and the intake air amount Ga. The rotation speed NE is calculated by the CPU 72 based on the output signal Scr of the crank angle sensor 82.

A feedback process M12 calculates and outputs a feedback correction coefficient KAF by adding one to a correction ratio δ of the base injection amount Qb. The feedback correction coefficient KAF is a feedback operating amount, that is, an operating amount that causes the upstream detection value Afu to be a target value Af* through feedback control. More specifically, in the feedback process M12, the difference between the upstream detection valve Afu and the target value Af* is input to a proportional element and a differential element to obtain output values, and the correction ratio δ is the sum of these output values and an output value of an integral element that maintains and outputs an integrated value corresponding to the difference.

A request injection amount calculation process M14 multiplies the base injection amount Qb by the feedback correction coefficient KAF to calculate a request injection amount Qd.

An injection valve operation process M16 outputs an operating signal MS2 to the fuel injection valve 26 so that fuel corresponding to the request injection amount Qd is injected into the combustion chamber 24 in one combustion cycle.

A target value setting process M18 sets the target value Af* to be slightly richer than the stoichiometric air-fuel ratio when the downstream detection value Afd is slightly leaner than the stoichiometric air-fuel ratio, and sets the target value Af* to be slightly leaner than the stoichiometric air-fuel ratio when the downstream detection value Afd is slightly richer than the stoichiometric air-fuel ratio. More specifically, the target value setting process M18 estimates an alcohol concentration Da of the fuel based on the value of the feedback correction coefficient KAF to obtain the stoichiometric air-fuel ratio and set the target value Af*.

A temperature estimation process M20 calculates a filter temperature Tgpf, which is an estimated value of the temperature of the GPF 38, based on the rotation speed NE, the charging efficiency η, the vehicle speed SPD, and ignition timing aig. More specifically, the temperature estimation process M20 includes a process that obtains the base value through map calculation using the CPU 72 based on map data in which the rotation speed NE and the charging efficiency η are input variables and the base value of the temperature of the GPF 38 is an output variable. The temperature estimation process M20 further includes a process that corrects the base value so that when the vehicle speed SPD is high, the filter temperature Tgpf is lower than when the vehicle speed SPD is low. This process may be implemented by the CPU 72 obtaining a first correction amount, which is used to correct the base value, through map calculation based on map data in which the vehicle speed SPD is an input variable and the first correction amount is an output variable. The temperature estimation process M20 further includes a process that corrects the base value so that when the ignition timing aig is at a retardation side, the filter temperature is higher than when the ignition timing aig is at an advance side. This process may be implemented by the CPU 72 obtaining a second correction amount, which is used to correct the base value, through map calculation based on map data in which the ignition timing aig is an input variable and the second correction amount is an output variable.

The map data refers to a data set of discrete values of an input variable and values of an output variable corresponding to each value of the input variable. When the value of an input variable matches any value of an input variable in the map data, the map calculation may use the corresponding value of an output variable in the map data as the calculation result. When the value of the input variable does not match any value of the input variable in the map data, the map calculation may use a value obtained by interpolating multiple values of the output variable included in the map data set as the calculation result.

An oxidation amount estimation process M22 estimates an oxidation amount Qox of PM in the GPF 38 based on the intake air amount Ga, the downstream detection value Afd, the filter temperature Tgpf, a PM deposition amount DPM, and an oxygen storage amount Cox of the GPF 38. More specifically, the oxidation amount estimation process M22 executes calculation so that when the filter temperature Tgpf is high, the value of the oxidation amount Qox is greater than when the filter temperature Tgpf is low. On condition that the filter temperature Tgpf is greater than or equal to a specified temperature, the oxidation amount estimation process M22 executes calculation so that when the PM deposition amount DPM is large, the value of the oxidation amount Qox is greater than when the PM deposition amount DPM is small, and so that when the oxygen storage amount Cox is large, the value of the oxidation amount Qox is greater than when the oxygen storage amount Cox is small. In addition, on condition that the filter temperature Tgpf is greater than or equal to the specified temperature, the oxidation amount estimation process M22 executes a calculation so that when the lean level of the downstream detection value Afd in relation to the stoichiometric air-fuel ratio is high, the value of the oxidation amount Qox is greater than when the lean level is low. In addition, on condition that the filter temperature Tgpf is greater than or equal to the specified temperature and the downstream detection value Afd is leaner than the stoichiometric air-fuel ratio, the oxidation amount estimation process M22 executes calculation so that when the intake air amount Ga is large, the value of the oxidation amount Qox is greater than when the intake air amount Ga is small.

More specifically, for example, the flow rate of oxygen flowing into the GPF 38 may be calculated from the intake air amount Ga and the downstream detection value Afd, and the CPU 72 may obtain the oxidation amount Qox through map calculation based on map data in which the flow rate of oxygen, the oxygen storage amount Cox, the filter temperature Tgpf, and the PM deposition amount DPM are input variables and the oxidation amount Qox is an output variable.

A storage amount estimation process M24 estimates the oxygen storage amount Cox of the catalyst supported by the GPF 38. This will be described later.

A PM deposition amount estimation process M26 estimates an amount of particulate matter collected by the GPF 38 (PM deposition amount DPM) based on the rotation speed NE, the charging efficiency η, the upstream detection valve Afu, and the oxidation amount Qox. More specifically, the PM deposition amount estimation process M26 calculates an increased amount of the PM deposition amount DPM based on the rotation speed NE, the charging efficiency η, and the upstream detection valve Afu, and adds the increased amount to the PM deposition amount DPM and subtracts the oxidation amount Qox from the PM deposition amount DPM to update the PM deposition amount DPM. The increased amount of the PM deposition amount DPM may be obtained by the CPU 72 through map calculation based on map data in which the rotation speed NE, the charging efficiency η, and the upstream detection valve Afu are input variables and the increased amount is an output variable.

A deterioration estimation process M28 estimates a deterioration degree Rd of the three-way catalyst supported by the GPF 38. More specifically, the deterioration estimation process M28 estimates that the value of the deterioration degree Rd is increased as the filter temperature Tgpf is in a high temperature state for a longer time.

An in-catalyst flow rate calculation process M30 calculates an in-catalyst flow rate CF, which is a volumetric flow rate of a fluid flowing through the GPF 38, based on the rotation speed NE and the charging efficiency η. More specifically, this process is implemented as follows. The CPU 72 calculates a mass flow rate of the fluid flowing into the GPF 38 based on the charging efficiency η and the rotation speed NE. The CPU 72 also estimates pressure and temperature of the fluid flowing into the GPF 38 based on the rotation speed NE and the charging efficiency η, and converts the mass flow rate into the volumetric flow rate based on the estimated values. The CPU 72 converts the converted volumetric flow rate into the volumetric flow rate of the GPF 38 based on the ratio of the cross-sectional area of the flow passage in the GPF 38 to the cross-sectional area of the flow passage in the exhaust passage 34 disposed upstream of the GPF 38 to calculate the in-catalyst flow rate CF.

A regeneration process M32 operates the ignition device 28 to oxidize and remove PM collected in the GPF 38 when the PM deposition amount DPM is greater than or equal to a first specified value. More specifically, the ignition timing of the ignition device 28 is retarded to increase the temperature of the exhaust gas so that PM in the GPF 38 reacts with and is oxidized by oxygen stored in the catalyst of the GPF 38. At this time, the air-fuel ratio of the mixture in the combustion chamber 24 may be set to be leaner than the stoichiometric air-fuel ratio so that oxygen is supplied to the GPF 38. When the PM deposition amount DPM is less than or equal to a second specified value that is less than the first specified value, the regeneration process M32 is stopped.

Figure 3:
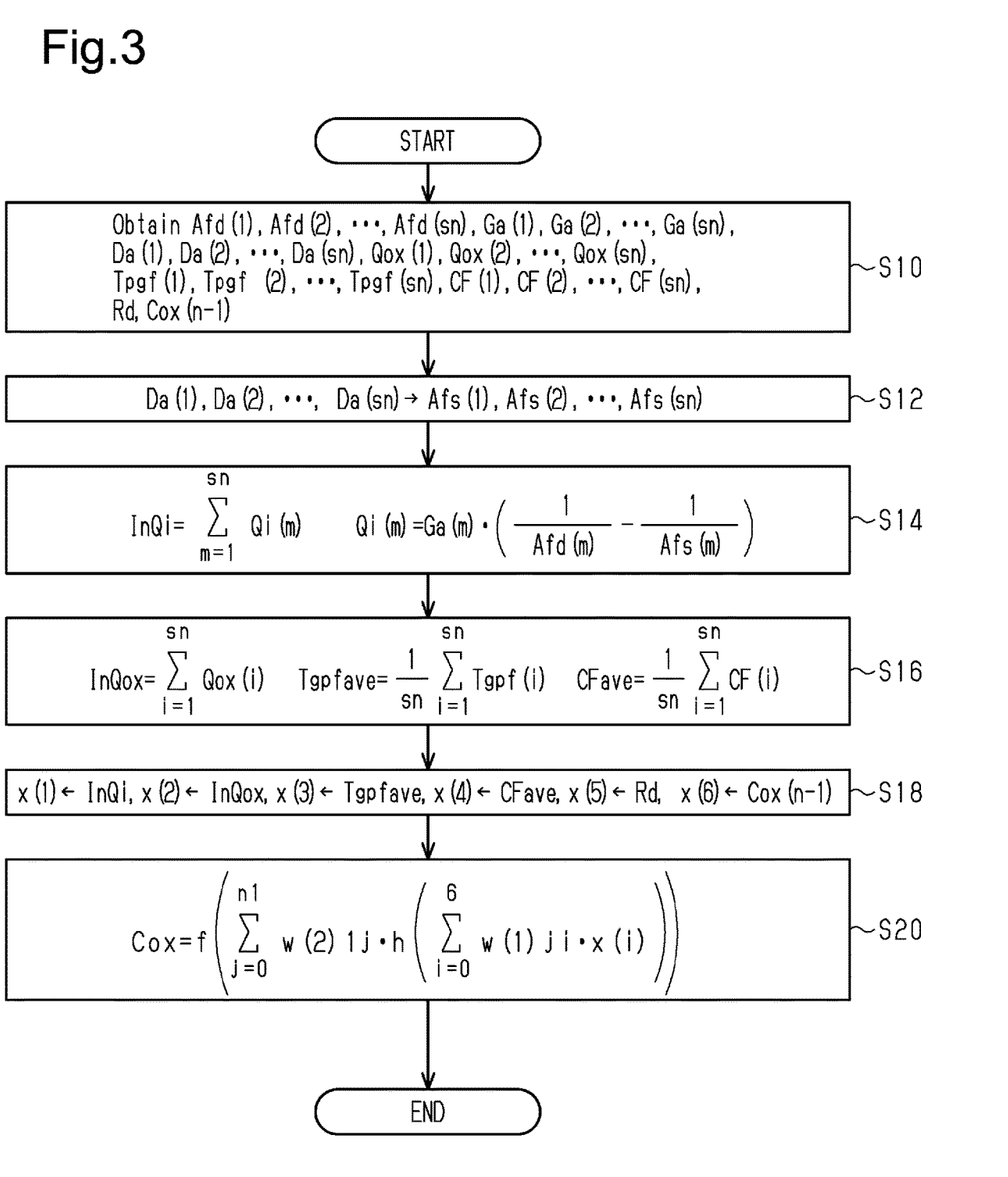
FIG. 3 is a flowchart showing the procedures of a process executed by the controller of the first embodiment.

FIG. 3 shows the procedures of the storage amount estimation process M24. The process shown in FIG. 3 is implemented by the CPU 72 executing a storage amount estimation program 74a stored in the ROM 74, for example, in predetermined intervals. In the following description, the step number of each process is represented by a numeral provided with "S" in front.

In a series of processes shown in FIG. 3, the CPU 72 obtains time series data of each of the downstream detection value Afd, the intake air amount Ga, the alcohol concentration Da, the oxidation amount Qox, the filter temperature Tgpf, and the in-catalyst flow rate CF in a predetermined period and also obtains the deterioration degree Rd in the predetermined period and the previous value of the oxygen storage amount Cox (S10). In the following description, "1, 2, . . . , sn" are given in order from older points in time of sampling. For example, "Afd(1) to Afd(sn)" refer to time series data of the downstream detection value Afd. The letters "sn" refer to the number of data pieces included in time series data of each variable. More specifically, the predetermined period is set to a period in which "sn" pieces of each variable described above are sampled. The predetermined period is determined from a sampling cycle and the number of data pieces "sn." The previous value of the oxygen storage amount Cox is the value calculated in the previous execution of a series of processes shown in FIG. 3 and is denoted by "Cox(n−1)" in FIG. 3. When the process shown in FIG. 3 is initially executed, the oxygen storage amount Cox may be set to a default value. The default value may be an assumed value corresponding to when the internal combustion engine 10 is stopped for a long time.

Then, the CPU 72 calculates the stoichiometric air-fuel ratio Afs(m) of fuel having the alcohol concentration Da(m), where m=1 to sn (S12). When the alcohol concentration Da(m) is high, the CPU 72 calculates the stoichiometric air-fuel ratio Afs(m) to be a smaller value than when the alcohol concentration Da(m) is low.

The CPU 72 calculates an excess-deficient fuel amount integrated value InQi, which is an integrated value of an actual amount (excess-deficient fuel amount Qi) of fuel that is excess or deficient in relation to the amount of fuel that sets the air-fuel ratio of the mixture in the combustion chamber 24 to the stoichiometric air-fuel ratio (S14). In the present embodiment, when the excess-deficient fuel amount Qi is a positive value, the excess-deficient fuel amount Qi indicates an excess amount of actual fuel in relation to the amount of fuel that sets the air-fuel ratio of the mixture in the combustion chamber 24 to the stoichiometric air-fuel ratio. More specifically, the CPU 72 calculates the excess-deficient fuel amount Qi(m) as "Ga(m)·[{1/Afd(m)}−{1/Afs(m)}]," where m=1 to sn. The CPU 72 adds the excess-deficient fuel amounts Qi(1) to Qi(sn) to calculate the excess-deficient fuel amount integrated value InQi.

Then, the CPU 72 calculates an oxidation amount integrated value InQox, a filter temperature average value Tgpfave, and an in-catalyst flow rate average value CFave (S16). More specifically, the CPU 72 adds the oxidation amounts Qox(1) to Qox(sn) to calculate the oxidation amount integrated value InQox. The CPU 72 divides the added value of the filter temperatures Tgpf(1) to Tgpf(sn) by "sn" to calculate the filter temperature average value Tgpfave. The CPU 72 also divides the added value of the in-catalyst flow rates CF(1) to CF(sn) by "sn" to calculate the in-catalyst flow rate average value CFave.

The CPU 72 assigns the values calculated in the processes of S14 and S16, the deterioration degree Rd, and the previous value Cox(n−1) to input variables x(1) to x(6) of a mapping that outputs the oxygen storage amount Cox (S18). More specifically, the CPU 72 assigns the excess-deficient fuel amount integrated value InQi to the input variable x(1), assigns the oxidation amount integrated value InQox to the input variable x(2), and assigns the filter temperature average value Tgpfave to the input variable x(3). The CPU 72 assigns the in-catalyst flow rate average value CFave to the input variable x(4), assigns the deterioration degree Rd to the input variable x(5), and assigns the previous value Cox(n−1) to the input variable x(6).

The CPU 72 assigns the input variables x(1) to x(6) to a mapping specified by mapping data 76a shown in FIG. 1 to calculate the oxygen storage amount Cox (S20).

In the present embodiment, this mapping is configured by a neural network including one intermediate layer. In the neural network, an activation function h of the intermediate layer is a hyperbolic tangent and an activation function f of an output layer is a rectified linear unit (ReLU). The ReLU is a function that outputs the non-lesser one of the input and zero. The value of each of "n1" pieces of nodes in the intermediate layer is generated by inputting the input variables x(1) to x(6) to a linear mapping specified by a coefficient $w(1)ji$ ($j=0$ to n1, $i=0$ to 6) to obtain "n1" pieces of output values and inputting the output values to the activation function h. In this case, $w(1)j0$ is one of the bias parameters, and an input variable $x(0)$ is defined as one.

When the process of S20 is completed, the CPU 72 temporarily ends the series of processes shown in FIG. 3.

The mapping data 76a may be learned as follows. The internal combustion engine 10 runs with air-fuel ratio sensors disposed at the upstream side and the downstream side of the GPF 38. When the downstream detection value Afd, which is the detection value of the upstream air-fuel ratio sensor, is lean, the flow rate of oxygen flowing to the GPF 38 is calculated from the downstream detection value Afd and the intake air amount Ga, and the flow rate of oxygen discharging from the GPF 38 is calculated from the intake air amount Ga and the detection value of the air-fuel ratio sensor disposed downstream of the GPF 38. This calculates an increased amount of the oxygen storage amount Cox of the GPF 38 when the downstream detection value Afd is lean. When the downstream detection value Afd is rich, the flow rate of unburned fuel flowing into the GPF 38 is calculated from the downstream detection value Afd and the intake air amount Ga, and the flow rate of unburned fuel discharging from the GPF 38 is calculated from the intake air amount Ga and the detection value of the air-fuel ratio sensor disposed downstream of the GPF 38. This calculates a decreased amount of the oxygen storage amount Cox of the GPF 38 when the downstream detection value Afd is rich. While teacher data of the oxygen storage amount Cox is calculated based on the increased amount and the decreased amount of the oxygen storage amount Cox, a process similar to the process shown in FIG. 3 is executed to calculate an oxygen storage amount Cox to obtain an error. The coefficients $w(1)ji$ and $w(2)1j$ are updated so that the sum of squares of the errors is reduced.

When the oxygen storage amount Cox is calculated, the oxidation amount estimation process M22 calculates the oxidation amount Qox based on the oxygen storage amount Cox. When the oxygen storage amount Cox is less than or equal to a predetermined value, during a period in which the target value Af* is set to be leaner than the stoichiometric air-fuel ratio, the target value setting process M18 sets the target value Af* to be leaner than normal.

The operation and advantages of the present embodiment will now be described.

The CPU 72 calculates the oxidation amount Qox based on the oxygen storage amount Cox and calculates the PM deposition amount DPM based on the oxidation amount Qox. The CPU 72 updates the oxygen storage amount Cox based on, for example, the previous value Cox(n−1) of the oxygen storage amount Cox and the excess-deficient fuel amount integrated value InQi. The excess-deficient fuel amount integrated value InQi is a variable used to obtain an amount of change in the oxygen storage amount Cox. Therefore, the oxygen storage amount Cox is calculated using the previous value Cox(n−1) in addition to the excess-deficient fuel amount integrated value InQi.

In particular, even when using multiple parameters that may affect the oxygen storage amount Cox, calculation of the oxygen storage amount Cox through machine learning reduces the number of man-hours for adaptation, for example, as compared to adaptation of map data used to obtain the oxygen storage amount Cox through map calculation. This is because, in a learning process of machine learning as described above, the mapping data 76a may be learned using a known process by repeating the process shown in FIG. 3 so that the oxygen storage amount Cox is calculated a number of times while the internal combustion engine 10 is relatively freely running. More specifically, the oxygen storage amount Cox is calculated through a join operation of the excess-deficient fuel amount integrated value InQi and the filter temperature Tgpf using the coefficient $w(1)ji$, which is a parameter learned by machine learning. Therefore, only the coefficient $w(1)ji$, which is common to various values of the filter temperature Tgpf, may be learned in the learning process of machine learning. On the other hand, when map data is used, separate data needs to be adapted in accordance with, for example, the values of the filter temperature Tgpf.

The present embodiment described above further obtains the following operation and advantages.

(1) The filter temperature average value Tgpfave is included in the input to the mapping that outputs the oxygen storage amount Cox. This allows the oxygen storage amount Cox to be calculated reflecting the dependency of the maximum value of the oxygen storage amount Cox on the temperature of the catalyst in the GPF 38 and the dependency of the consumption amount of oxygen in the catalyst on the temperature of the catalyst.

Moreover, when the filter temperature average value Tgpfave is input to the mapping, while the oxygen storage amount Cox is calculated with high accuracy, the calculation cycle of the oxygen storage amount Cox may extend as compared to when the filter temperature Tgpf is input to the mapping.

(2) The in-catalyst flow rate average value CFave is included in the input to the mapping that outputs the oxygen storage amount Cox. This allows the oxygen storage amount Cox to be calculated reflecting the reaction rate of stored oxygen with unburned fuel that changes in accordance with the flow rate of fluid flowing through the GPF 38.

Moreover, when the in-catalyst flow rate average value CFave is input to the mapping, while the oxygen storage amount Cox is calculated with high accuracy, the calculation cycle of the oxygen storage amount Cox may extend as compared to when the in-catalyst flow rate CF is input to the mapping.

(3) The excess-deficient fuel amount integrated value InQi is input to the mapping. This allows the calculation cycle of the oxygen storage amount Cox to extend as compared to when the excess-deficient fuel amount Qi is input to the mapping, while the oxygen storage amount Cox is calculated with high accuracy.

(4) The downstream detection value Afd is used to calculate the excess-deficient fuel amount Qi. Thus, the excess-deficient fuel amount Qi is calculated with higher accuracy than when the upstream detection valve Afu is used.

(5) The deterioration degree Rd of the catalyst in the GPF 38 is included in the input to the mapping. This allows the oxygen storage amount Cox to be calculated reflecting the maximum value of the oxygen storage amount Cox of the catalyst in the GPF 38 that varies in accordance with the deterioration degree Rd.

(6) The oxidation amount integrated value InQox is included in the input to the mapping. This allows the oxygen storage amount Cox to be calculated taking into consideration that the oxygen storage amount Cox is decreased in accordance with the oxidation amount of particulate matter in the catalyst.

Moreover, when the oxidation amount integrated value InQox is input to the mapping, while the oxygen storage amount Cox is calculated with high accuracy, the calculation cycle of the oxygen storage amount Cox may extend as compared to when the oxidation amount Qox is input to the mapping.

(7) When the oxidation amount Qox is calculated based on the oxygen storage amount Cox calculated by machine learning described above, the oxidation amount Qox is calculated based on a large number of variables while limiting increases in the number of man-hours for adaptation as compared to when map data is used. Thus, the oxygen storage amount Cox is calculated with high accuracy. This allows the PM deposition amount DPM to be calculated with high accuracy and may reduce the margin of the first specified value, which is the threshold value of the PM deposition amount DPM used to execute the regeneration process M32. As a result, unnecessary execution of the regeneration process M32 is reduced, thereby reducing the energy consumption rate. In addition, the margin of the second specified value, which is the threshold value of the PM deposition amount DPM used to stop the regeneration process M32, may be reduced. This limits over-lengthening of an execution period of the regeneration process M32, thereby reducing the energy consumption rate.

(8) The target value Af* is changed so that when the oxygen storage amount Cox is less than or equal to the predetermined amount, the lean level of the air-fuel ratio of the mixture in the combustion chamber 24 of the internal combustion engine 10 in relation to the stoichiometric air-fuel ratio is increased as compared to when the oxygen storage amount Cox is greater than the predetermined amount. This increases the amount of oxygen stored in the catalyst in the GPF 38 and thus maintains a high purification rate of unburned fuel flowing to the GPF 38.

In particular, when the oxygen storage amount Cox is calculated by machine learning described above, the oxygen storage amount Cox is calculated based on a large number of variables while limiting increases in the number of man-hours for adaptation as compared to when map data is used. The oxygen storage amount Cox is calculated with high accuracy. Therefore, when the target value Af* is controlled to be lean in accordance with the oxygen storage amount Cox, the amount of oxygen in the catalyst supported by the GPF 38 will not be excessively decreased. As a result, while minimizing the amount of noble metal in the catalyst supported by the GPF 38, discharging of unburned fuel to the downstream side of the GPF 38 is limited.

Second Embodiment

A second embodiment will now be described with reference to the drawings. The differences from the first embodiment will mainly be discussed.

In the present embodiment, the process for calculating the oxygen storage amount Cox is executed outside the vehicle.

Figure 4:
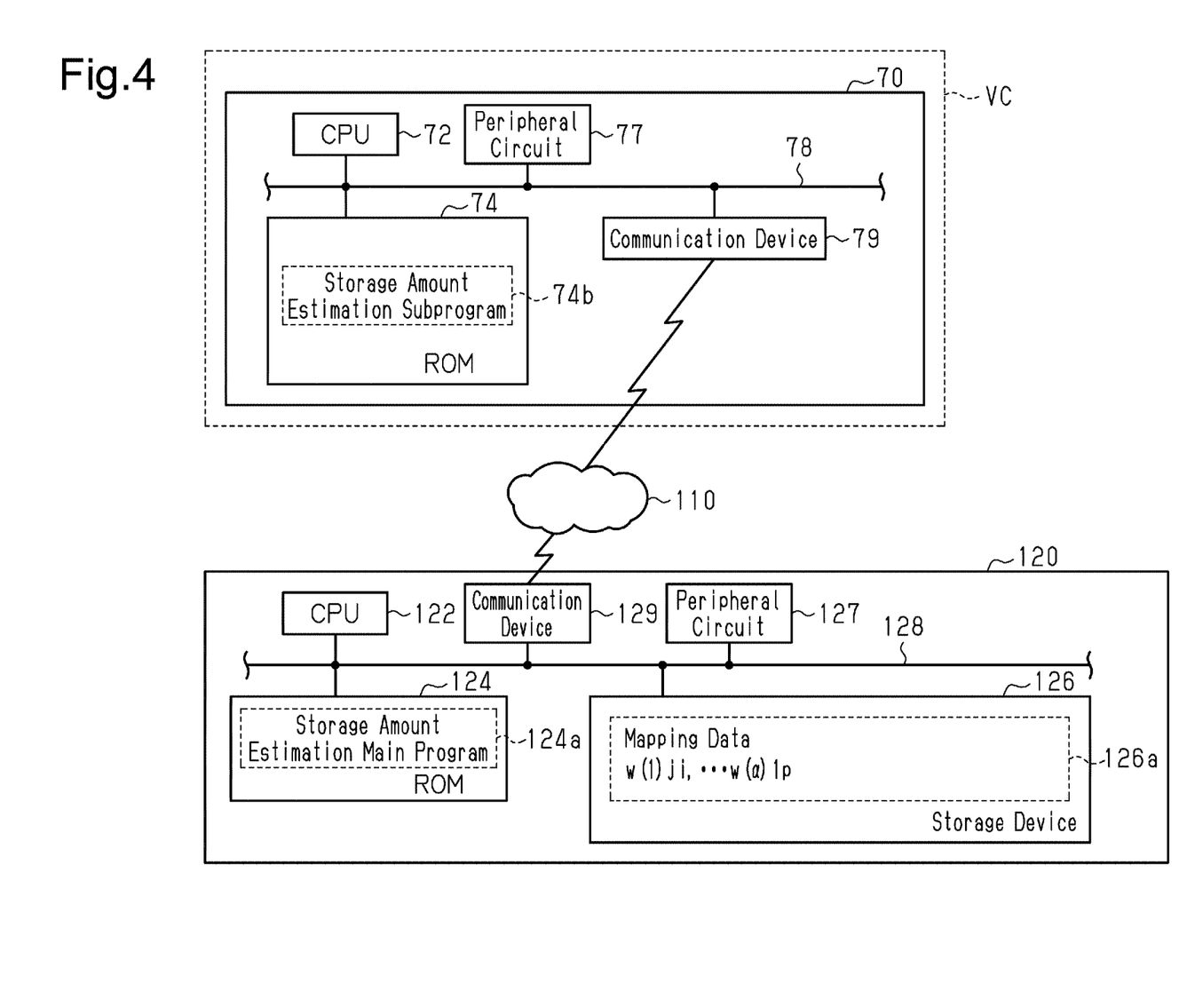
FIG. 4 is a diagram showing the configuration of an oxygen storage amount estimation system according to a second embodiment.

FIG. 4 shows a faulty detection system of the present embodiment. For the sake of convenience, in FIG. 4, the same reference numerals are given to the components that are the same as those in FIG. 1.

FIG. 4 shows a controller 70 that is disposed in a vehicle VC and includes a communication device 79. The communication device 79 is configured to communicate with a center 120 through a network 110 disposed outside the vehicle VC.

The center 120 analyzes data transmitted from multiple vehicles VC. The center 120 includes a CPU 122, a ROM 124, a storage device 126, a peripheral circuit 127, and a communication device 129, which are configured to communicate with each other through a local network 128. The storage device 126 stores mapping data 126a.

Figure 5:
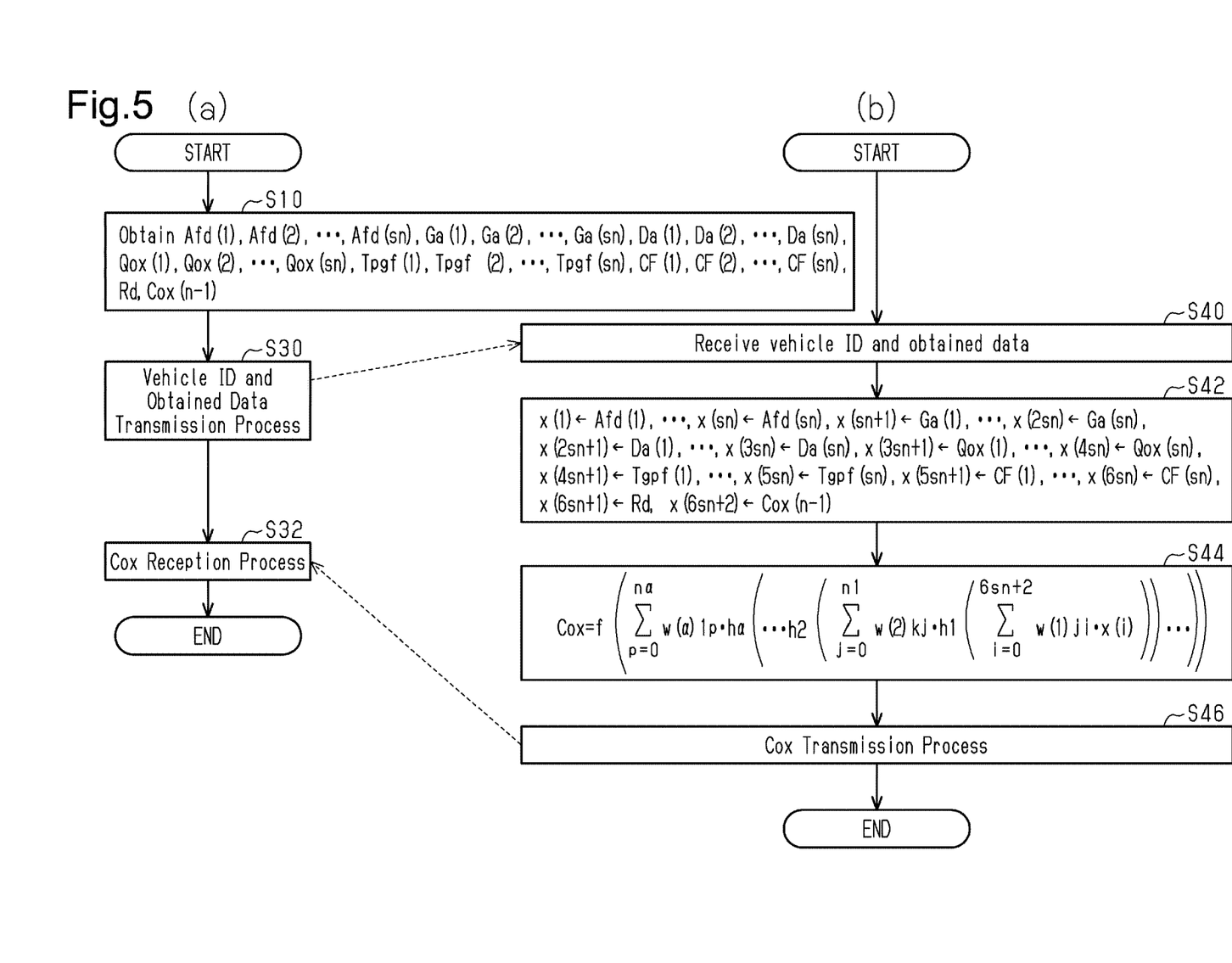
FIG. 5 is a flowchart showing the procedures of a process executed by the oxygen storage amount estimation system of the second embodiment.

FIG. 5 shows the procedures of a process executed by the system shown in FIG. 4. The process shown in (a) in FIG. 5 is implemented by the CPU 72 executing a storage amount estimation subprogram 74b stored in the ROM 74 shown in FIG. 4. The process shown in (b) in FIG. 5 is implemented by the CPU 122 executing a storage amount estimation main program 124a stored in the ROM 124 shown in FIG. 4. For the sake of convenience, in FIG. 5, the same step numbers are given to the processes that correspond to those in FIG. 3. The process shown in FIG. 5 will be described below along a temporal sequence of the process for calculating the oxygen storage amount Cox.

As shown in (a) in FIG. 5, when the process of S10 is completed, the CPU 72 operates the communication device 79 to transmit data obtained in the process of S10 together with vehicle ID, which is identification information of the vehicle VC, to the center 120 (S30).

As shown in (b) in FIG. 5, the CPU 122 of the center 120 receives the transmitted data (S40) and assigns, for example, the values obtained in the process of S40 to the input variables x(1) to x(6sn+2) of the mapping specified by the mapping data 126a stored in the ROM 124 shown in FIG. 4 (S42). More specifically, the CPU 72 assigns the downstream detection value Afd(m) to the input variable x(m), assigns the intake air amount Ga(m) to the input variable x(sn+m), assigns the alcohol concentration Da(m) to the input variable x(2sn+m), and assigns the oxidation amount Qox(m) to the input variable x(3sn+m), where m=1 to sn. In addition, the CPU 72 assigns the filter temperature Tgpf(m) to the input variable x(4sn+m), assigns the in-catalyst flow rate CF(m) to the input variable x(5sn+m), assigns the deterioration degree Rd to the input variable x(6sn+1), and assigns the previous value Cox(n−1) to the input variable x(6sn+2).

Then, the CPU 72 inputs the input variables x(1) to x(6sn+2) to the mapping specified by the mapping data 126a stored in the storage device 126 shown in FIG. 4 to calculate the oxygen storage amount Cox, which is an output value of the mapping (S44).

In the present embodiment, this mapping is configured by a neural network including "α" intermediate layers. In the neural network, activation functions h1 to hα of the intermediate layers are hyperbolic tangents and an activation function f of an output layer is ReLU. More specifically, when m=1, 2, . . . , α, the value of each node in the m-th intermediate layer is generated by inputting an output of a linear mapping specified by a coefficient w(m) to the activation function hm. In FIG. 5, n1, n2, . . . , nα are the numbers of nodes in the first, second, . . . , and α-th intermediate layers, respectively. More specifically, for example, the value of each of "n1" pieces of nodes in the first intermediate layer is generated by inputting the input variables x(1) to x(6sn+2) to a linear mapping specified by the coefficient w(1)ji (j=0 to n1, i=0 to 6sn+2) to obtain "n1" pieces of output values and inputting the output values to the activation function h1. In this case, w(1)j0 is one of the bias parameters, and an input variable x(0) is defined as one.

The CPU 122 operates the communication device 129 to transmit a signal related to the oxygen storage amount Cox to the vehicle VC that has transmitted the data received by the CPU 122 in the process of S40 (S46). The CPU 122 temporarily ends the series of processes shown in (b) in FIG. 5. As shown in (a) in FIG. 5, the CPU 72 receives the oxygen storage amount Cox (S32) and temporarily ends the series of processes shown in (a) in FIG. 5.

As described above, in the present embodiment, the center 120 executes the process of S44. This reduces the calculation load on the CPU 72.

Correspondence Relationship

Correspondence relationship between the items in the embodiments described above and the items described in "Summary" is as follows. Hereinafter, the correspondence relationship is shown with each number of the aspects described in "Summary."

[1, 4, 9] The catalyst corresponds to the GPF 38. The execution device and the processing circuitry correspond to the CPU 72 and the ROM 74. The excess-deficient amount variable corresponds to the excess-deficient fuel amount integrated value InQi. The obtainment process corresponds to the processes of S10 to S16. The storage amount variable calculation process corresponds to the processes of S18 and S20. The operation process corresponds to the regeneration process M32, the target value setting process M18 when the oxygen storage amount Cox is less than or equal to the set value, the feedback process M12, the request injection amount calculation process M14, and the injection valve operation process M16.

[2] The temperature variable corresponds to the filter temperature average value Tgpfave.

[3] The flow rate variable corresponds to the in-catalyst flow rate average value CFave.

[5] The upstream catalyst corresponds to the catalyst 36.

[6] The deterioration variable corresponds to the deterioration degree Rd.

[7] The oxidation amount variable corresponds to the oxidation amount integrated value InQox.

[8] The exhaust temperature operating unit used to increase the temperature of exhaust gas corresponds to the ignition device 28.

[10] The oxygen storage amount estimation system corresponds to the controller 70 and the center 120. The first execution device corresponds to the CPU 72 and the ROM 74. The second execution device corresponds to the CPU 122 and the ROM 124. The excess-deficient amount variable corresponds to the downstream detection values Afd(1) to Afd(sn), the intake air amounts Ga(1) to Ga(sn), and the alcohol concentrations Da(1) to Da(sn). The obtainment process corresponds to the process of S10. The vehicle-side transmission process corresponds to the process of S30. The vehicle-side reception process corresponds to the process of S32. The external reception process corresponds to the process of S40. The storage amount variable calculation process corresponds to the processes of S42 and S44. The vehicle-side transmission process corresponds to the process of S46.

[11] The data analysis device corresponds to the center 120.

[12] The controller for an internal combustion engine corresponds to the controller 70.

[13] The computer corresponds to the CPU 72 and the ROM 74 or the CPUs 72 and 122 and the ROMs 74 and 124.

Other Embodiments

The embodiments may be modified as follows. The embodiments and the following modified examples can be combined as long as the combined modified examples remain technically consistent with each other.

Excess-Deficient Amount Variable

The downstream detection value Afd may be sampled a number of times in the calculation cycle of the excess-deficient fuel amount Qi. The excess-deficient fuel amount Qi may be calculated based on an average value of the sampled downstream detection values Afd.

In the process shown in FIG. 3, the stoichiometric air-fuel ratio Afs is variably set in accordance with alcohol concentration. Instead, the stoichiometric air-fuel ratio Afs may be a fixed value. In this case, the alcohol concentration Da does not have to be obtained in the process of S10, and the process of S12 may be omitted.

In the process shown in FIG. 5, the excess-deficient amount variable is configured by the downstream detection value Afd, the intake air amount Ga, and the alcohol concentration Da. However, there is no limitation to such a configuration. For example, the excess-deficient fuel amounts Qi(1) to Qi(sn) may be input to the mapping.

The excess-deficient amount variable may be an average value of the excess-deficient fuel amounts Qi instead of being the excess-deficient fuel amount integrated value InQi.

For example, the sampling cycle of the downstream detection value Afd may be set to the execution cycle of the process shown in FIG. 3, and the excess-deficient fuel amount Qi may be input to the mapping.

In the embodiments, the excess-deficient amount variable is configured by the excess-deficient fuel amount Qi. However, there is no limitation to such a configuration. For example, the excess-deficient amount variable may be configured by an excess-deficient amount of oxygen. In this configuration, for example, an oxygen amount Kox that reacts with a unit amount of fuel without excess or deficiency may be used so that the excess-deficient amount of oxygen is "Kox·Ga·$\{(1/\text{Afs})-(1/\text{Afu})\}$."

The excess-deficient amount variable does not have to be a value that can be positive and negative, for example, by considering an excess amount of fuel as a positive value or considering an excess amount of oxygen as a positive value. The excess-deficient amount variable may be configured by two variables, The two variables are, for example, a variable that is greater than or equal to zero and indicates the excess amount of fuel and a variable that is greater than or equal to zero and indicates the excess amount of oxygen. The amount of fuel that reacts with oxygen contained in fluid flowing into the GPF 38 without excess or deficiency is referred to as the ideal fuel amount. The excess-deficient amount variable may be a variable corresponding to an actual amount of fuel that is excess or deficient in relation to the ideal fuel amount.

Temperature Variable

In the configuration described above, map data is used to estimate the filter temperature Tgpf. However, there is no limitation to such a configuration. The filter temperature Tgpf may be estimated, for example, using a neural network in which the input variables of the temperature estimation process M20 are inputs and the filter temperature Tgpf is an output variable.

Alternatively, for example, all of the input variables of the temperature estimation process M20 may be inputs to a mapping of a neural network that outputs the oxygen storage amount Cox. The temperature variable may be configured by a set of the input variables of the temperature estimation process M20.

For example, the sampling cycle of the filter temperature Tgpf may be set to the execution cycle of the process shown in FIG. 3, and the filter temperature Tgpf may be input to the mapping.

The filter temperature Tgpf does not necessarily have to be an estimated value. For example, the GPF 38 may include a temperature sensor such as a thermistor, and its detection value may be input to the mapping.

Flow Rate Variable

For example, the sampling cycle of the in-catalyst flow rate CF may be the execution cycle of the process shown in FIG. 3, and the in-catalyst flow rate CF may be input to the mapping.

In the embodiments, the in-catalyst flow rate CF is calculated from the rotation speed NE and the charging efficiency η. However, there is no limitation to such a configuration. For example, a pressure sensor and a temperature sensor may be provided in the exhaust passage 34 at the upstream side of the GPF 38 proximate to the catalyst 36, and the in-catalyst flow rate CF may be calculated based on the values of the pressure sensor and the temperature sensor and the intake air amount Ga.

Oxidation Amount Variable

For example, the sampling cycle of the oxidation amount Qox may be the execution cycle of the process shown in FIG. 3, and the oxidation amount Qox may be input to the mapping.

The oxidation amount variable may be an average value of the oxidation amounts Qox instead of being the oxidation amount integrated value InQox.

In the embodiments, map data is used to calculate the oxidation amount Qox. However, there is no limitation to such a configuration. For example, the flow rate of oxygen flowing into the GPF 38 may be calculated from the intake air amount Ga and the downstream detection value Afd, and the oxidation amount Qox may be calculated based on a neural network in which the flow rate of oxygen, the oxygen storage amount Cox, the filter temperature Tgpf, and the PM deposition amount DPM are input variables and the oxidation amount Qox is an output variable.

Deterioration Variable

Instead of inputting a single deterioration degree Rd to a mapping, for example, the deterioration degree Rd may be sampled a number of times in the execution cycle of the process shown in FIG. 3. The sampled time series data may be input to the mapping, or an average value of the data may be input to the mapping.

Input to Mapping

For example, instead of the oxidation amount variable such as the oxidation amount integrated value InQox, all of the input variables of the oxidation amount estimation process M22 may be input to the mapping that outputs the oxygen storage amount Cox. For example, instead of the temperature variable such as the filter temperature average value Tgpfave, all of the input variables of the temperature estimation process M20 may be input to the mapping that outputs the oxygen storage amount Cox.

For example, an input to the neural network and an input to the regression equation described below in "Machine Learning Algorithm" are not limited to those in which each dimension is formed by a single physical quantity. For example, in the embodiments, different types of physical quantities used as the input to the mapping are directly input to the neural network or the regression equation. Instead, one or more of the different types of the physical quantities may be analyzed for their main components, and the main components may be directly input to the neural network or the regression equation. However, when main components are input to the neural network or the regression equation, the main components do not necessarily have to be only a portion of the input to the neural network or the regression equation. The entirety of the input may be the main components. When main components are input to the mapping, the mapping data 76*a* and 126*a* include data specifying a mapping for determining the main components.

The input to the mapping may include an output value of the air-fuel ratio sensor disposed downstream of the catalyst, the oxygen storage amount Cox of which is calculated. In a mapping that updates the oxygen storage amount Cox based on the previous value of the oxygen storage amount Cox, if the detection value of the downstream air-fuel ratio sensor is further included, the oxygen storage amount Cox may be updated while correcting the amount of change in the oxygen storage amount based on the excess-deficient amount variable. This allows the oxygen storage amount Cox to be calculated with higher accuracy.

Mapping Data

For example, according to the description of FIG. 5, the number of intermediate layers in the neural network is expressed as being more than two layers. However, there is no limitation to such a configuration.

In the embodiments, the activation functions $h$, $h1$, $h2$, $h\alpha$ are hyperbolic tangents. However, there is no limitation to such a configuration. The activation functions $h$, $h1$, $h2$, . . . $h\alpha$ may be, for example, ReLUs. The activation functions $h$, $h1$, $h2$, . . . $h\alpha$ may be, for example, logistic sigmoid functions.

Mapping

The mapping is not limited to one that directly outputs the oxygen storage amount Cox. For example, a mapping that outputs an amount of change in the oxygen storage amount Cox may be included. In this case, the oxygen storage amount Cox may be updated by the sum of the amount of change and the previous value of the oxygen storage amount Cox.

Machine Learning Algorithm

The machine learning algorithm is not limited to one that uses a neural network. For example, a regression equation may be used. This corresponds to a neural network having no intermediate layer.

Regeneration Process

In the configurations described above, the ignition device 28 is operated as the operating unit of the internal combustion engine 10 used to increase the temperature of exhaust gas. However, there is no limitation to such a configuration. For example, the fuel injection valve 26 may be operated.

Data Analysis Device

For example, the processes of S18 and S20 shown in FIG. 3 may be executed by the center 120.

The process shown in (b) in FIG. 5 may be executed by a mobile terminal carried by the user. This may be implemented when an application program that executes the process shown in (b) in FIG. 5 is installed in the mobile terminal. At this time, the process for receiving the vehicle ID may be omitted, for example, by setting the valid distance of data transmission in the process of S46 to approximately the length of the vehicle.

Execution Device

The execution device is not limited to a device including the CPU 72 (122) and the ROM 74 (124) and executing the software processes. For example, a dedicated hardware circuit (e.g., ASIC, etc.) configured to process at least some of the software processes executed in the embodiments may be provided. More specifically, the execution device may be modified as long as it has any one of the following configurations (a) to (c). Configuration (a) includes a processor that executes all of the above-described processes according to programs and a program storage device such as a ROM that stores the programs. Configuration (b) includes a processor and a program storage device that execute some of the above-described processes in accordance with programs and a dedicated hardware circuit that executes the remaining processes. Configuration (c) includes a dedicated hardware circuit that executes all of the above-described processes. Multiple software circuits each including a processor and a program storage device may be provided. Multiple dedicated hardware circuits may be provided. More specifically, the above-described processes may be executed by processing circuitry that includes at least one of one or more software execution devices or one or more dedicated hardware circuits. The program storage device, that is, a computer readable medium, includes any medium that can be accessed from a general-purpose computer or a dedicated computer.

Storage Device

In the embodiments, the storage devices that store the mapping data 76a and 126a are separate from the storage devices (ROMs 74 and 124) that store the storage amount estimation program 74a and the storage amount estimation main program 124a. However, there is no limitation to such a configuration.

Computer

The computer is not limited to that configured by an execution device such as the CPU 72 and the ROM 74 mounted on the vehicle and an execution device such as the CPU 122 and the ROM 124 provided in the center 120. For example, the computer may be configured by an execution device mounted on the vehicle, an execution device provided in the center 120, and an execution device such as a CPU and a ROM in a mobile terminal of the user. This may be implemented, for example, when the output of the mapping is an amount of change in the oxygen storage amount Cox as described in "Mapping," the amount of change in the oxygen storage amount Cox is transmitted to the mobile terminal. The mobile terminal calculates the oxygen storage amount Cox. In this case, the mobile terminal transmits the oxygen storage amount Cox to the vehicle.

Catalyst Subject to Estimation of Oxygen Storage Amount

In the embodiments, the catalyst that is subject to estimation of the oxygen storage amount is the GPF 38. Instead, the catalyst 36 may be used. Moreover, while the catalyst that is subject to estimation of the oxygen storage amount is the GPF 38, the positions of the GPF 38 and the catalyst 36 may be switched. In such a case, the excess-deficient amount variable is calculated or configured based on the upstream detection valve Afu.

Internal Combustion Engine

In the embodiments, a direct injection valve that injects fuel into the combustion chamber 24 is illustrated as the fuel injection valve. Instead, the fuel injection valve may be, for example, a port injection valve that injects fuel into the intake passage 12. For example, both a port injection valve and a direct injection valve may be provided.

The internal combustion engine is not limited to a spark ignition type internal combustion engine and may be, for example, a compression ignition type internal combustion engine that uses, for example, diesel as fuel.

Others

The vehicle is not limited to a vehicle including only an internal combustion engine as a device that generates thrust force of the vehicle. The vehicle may be, for example, a parallel hybrid vehicle, a series hybrid vehicle, or a series-parallel hybrid vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An oxygen storage amount estimation device configured to estimate an oxygen storage amount of a catalyst disposed in an exhaust passage of an internal combustion engine, the oxygen storage amount estimation device, comprising:
   a storage device; and
   processing circuitry, wherein
   an amount of fuel that reacts with oxygen contained in a fluid flowing into the catalyst without excess or deficiency is an ideal fuel amount,
   a variable corresponding to an excess-deficient amount of an actual amount of fuel in relation to the ideal fuel amount is an excess-deficient amount variable,
   a variable related to the oxygen storage amount of the catalyst is a storage amount variable,
   the storage device stores mapping data, the mapping data being data specifying a mapping that uses multiple variables as an input to output a value of the storage amount variable, the multiple variables including at least the excess-deficient amount variable and a previous value of the storage amount variable,
   the processing circuitry is configured to execute
   an obtainment process that obtains the multiple variables,
   a storage amount variable calculation process that repeatedly calculates a value of the storage amount variable based on an output of the mapping using the multiple variables obtained by the obtainment process, and
   an operation process that operates predetermined hardware based on a calculation result of the storage amount variable calculation process, and
   the mapping data includes data learned by machine learning.

2. The oxygen storage amount estimation device according to claim 1, wherein
   the multiple variables include a temperature variable, and
   the temperature variable is a variable related to a temperature of the catalyst.

3. The oxygen storage amount estimation device according to claim 1, wherein
   the multiple variables include a flow rate variable, and
   the flow rate variable is a variable related to a flow rate of the fluid flowing into the catalyst.

4. The oxygen storage amount estimation device according to claim 1, wherein
   the excess-deficient amount is calculated based on a detection value of an air-fuel ratio sensor disposed upstream of the catalyst and a flow rate of the fluid flowing into the catalyst, and
   the excess-deficient amount variable is a variable related to an integrated value of the excess-deficient amount in a predetermined period.

5. The oxygen storage amount estimation device according to claim 4, wherein
   the catalyst is a downstream catalyst, an upstream catalyst is disposed in the exhaust passage upstream of the downstream catalyst, and the air-fuel ratio sensor is disposed between the upstream catalyst and the downstream catalyst.

6. The oxygen storage amount estimation device according to claim 1, wherein the multiple variables include a deterioration variable, and the deterioration variable is a variable related to a deterioration degree of the catalyst.

7. The oxygen storage amount estimation device according to claim 1, wherein the catalyst is supported by a filter configured to collect particulate matter contained in exhaust gas, the multiple variables include an oxidation amount variable, and the oxidation amount variable is a variable related to an oxidation amount of particulate matter collected in the filter.

8. The oxygen storage amount estimation device according to claim 1, wherein the catalyst is supported by a filter configured to collect particulate matter contained in exhaust gas, the processing circuitry is configured to execute a process that calculates a particulate matter (PM) deposition amount, which is an amount of the particulate matter collected in the filter, based on a value of the storage amount variable calculated by the storage amount variable calculation process, the predetermined hardware includes an exhaust temperature operating unit, the exhaust temperature operating unit is an operating unit of the internal combustion engine used to increase a temperature of exhaust gas, and the operation process includes a regeneration process that operates the exhaust temperature operating unit to burn the particulate matter collected in the filter.

9. The oxygen storage amount estimation device according to claim 1, wherein the catalyst is a downstream catalyst, an upstream catalyst is disposed in the exhaust passage upstream of the downstream catalyst, the predetermined hardware includes a fuel injection valve of the internal combustion engine, and the operation process includes a process that operates the fuel injection valve so that when the oxygen storage amount is less than or equal to a predetermined amount, a lean level of an air-fuel ratio of a mixture in a combustion chamber of the internal combustion engine in relation to a stoichiometric air-fuel ratio is increased as compared to when the oxygen storage amount is greater than the predetermined amount.

10. An oxygen storage amount estimation system having the oxygen storage amount estimation device according to claim 1, wherein the processing circuitry further comprises:

a first execution device that is mounted on a vehicle and that is configured to execute the obtainment process, a vehicle-side transmission process that transmits data obtained by the obtainment process outside the vehicle, a vehicle-side reception process that receives a signal based on a value of the storage amount variable calculated by the storage amount variable calculation process, and the operation process; and a second execution device that is disposed outside the vehicle and that is configured to execute an external reception process that receives data transmitted by the vehicle-side transmission process, the storage amount variable calculation process, and an external transmission process that transmits a signal based on a value of the storage amount variable calculated by the storage amount variable calculation process to the vehicle.

* * * * *